United States Patent [19]

Prouty

[11] Patent Number: 4,846,424
[45] Date of Patent: Jul. 11, 1989

[54] CONTROLLABLE AIRFOIL KITE
[75] Inventor: Jonathan J. Prouty, Loveland, Colo.
[73] Assignee: Skynasaur Inc., Louisville, Colo.
[21] Appl. No.: 150,125
[22] Filed: Jan. 29, 1988
[51] Int. Cl.$^4$ .................. B64C 31/06; B64D 17/02
[52] U.S. Cl. ............................. 244/153 R; 244/154; 244/155 A; 244/145; 244/152
[58] Field of Search ............... 244/153 R, 154, 155 A, 244/152, 145

[56] References Cited
U.S. PATENT DOCUMENTS

| | | | |
|---|---|---|---|
| 3,433,441 | 3/1969 | Cummings | 244/152 |
| 3,746,286 | 7/1973 | Christoffel | 244/155 A |
| 3,806,071 | 4/1974 | Brown | 244/153 R |
| 4,026,504 | 5/1977 | Christoffel, Jr. | 244/153 R |
| 4,129,272 | 12/1978 | Jones et al. | 244/153 R |
| 4,406,433 | 9/1983 | Radkey et al. | 244/145 |
| 4,768,739 | 9/1988 | Schnee | 244/153 R |

Primary Examiner—Joseph F. Peters, Jr.
Assistant Examiner—Rodney Corl
Attorney, Agent, or Firm—Beveridge, DeGrandi & Weilacher

[57] ABSTRACT

A ram-air airfoil stunt kite has its upper forward edge provided with two stiffener members that provide a rounded leading edge and are connected together by a flexible joint. Two operator-held control strings are connected to bridles which are, in turn, connected to keels on the kite. The outboard bridle strings are shorter than the inboard bridle strings so as to remain taut during normal flying operations. When the apparent wind velocity increases, the kite becomes transversely curved, whereupon the inboard bridle strings become taut to establish an optimum maximum curvature.

33 Claims, 2 Drawing Sheets

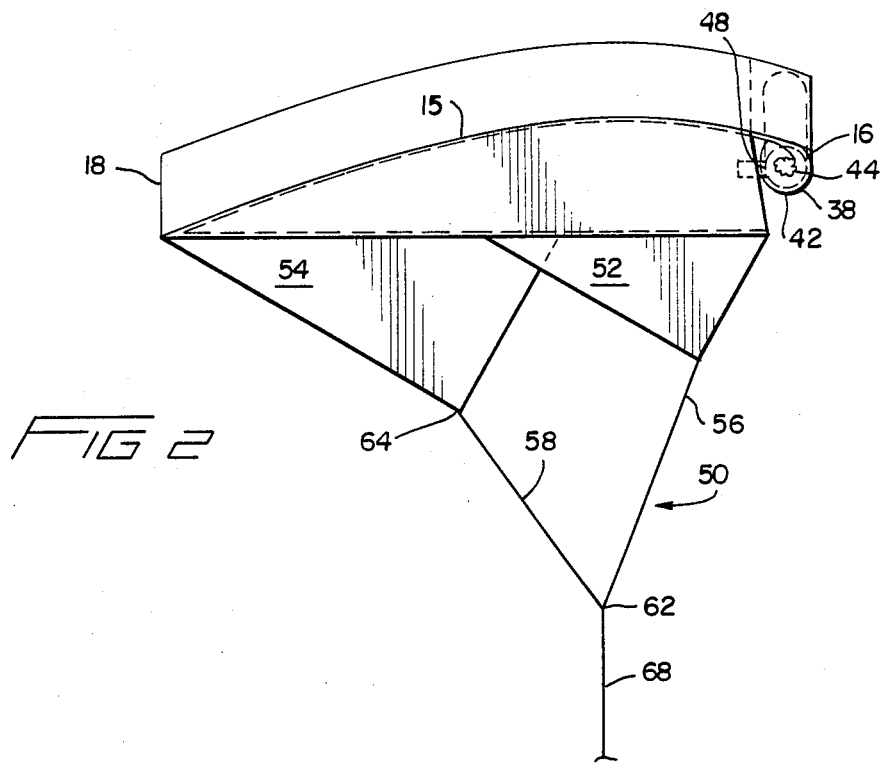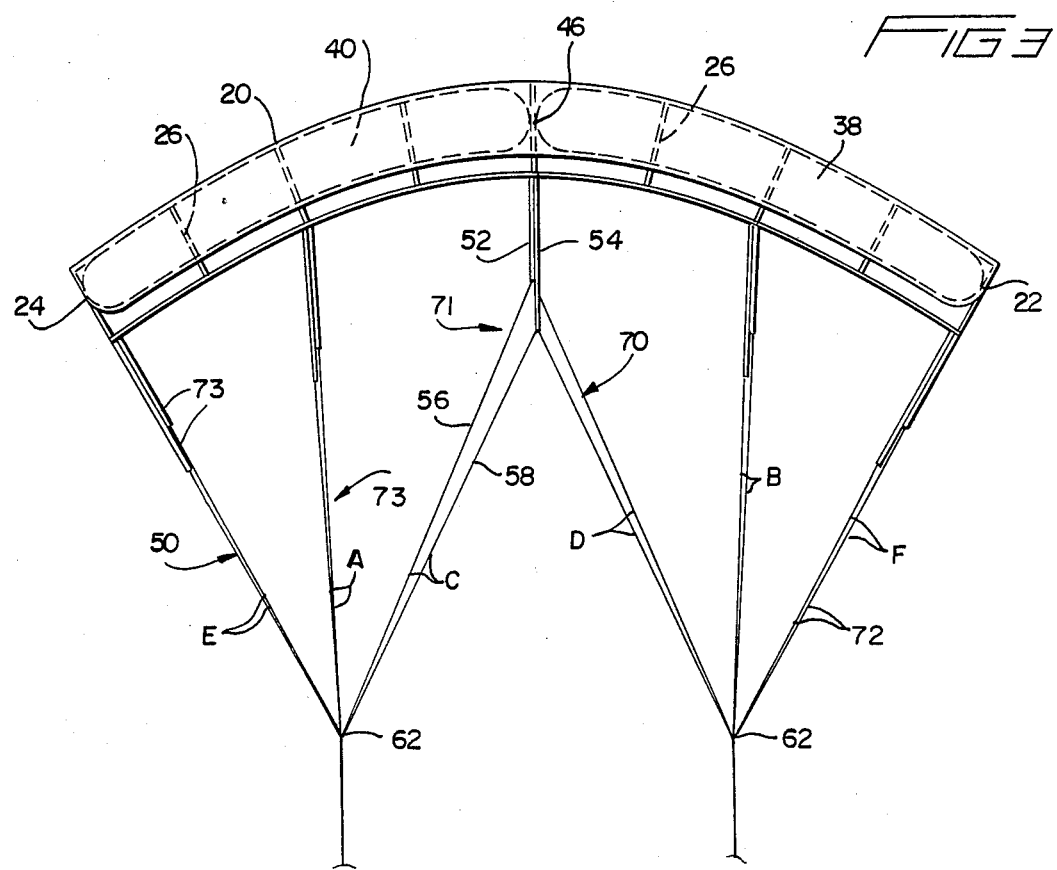

4,846,424

CONTROLLABLE AIRFOIL KITE

BACKGROUND OF THE INVENTION

The present invention relates to kites and more particularly to kites having an airfoil configuration.

DESCRIPTION OF THE PRIOR ART

Aerial devices in the form of hollow bodies with airfoil configurations and a plurality of cells adapted to be filled by ram-air principles are known in the art. For instance, U.S. Pat. Re Nos. 31,205 and 3,972,495 to Jalbert feature aerial sleds having, in vertical longitudinal cross-section, an airfoil configuration. The patents of Jalbert also reveal a plurality of inflatable cells which are filled by a ram-air principle.

Additionally, U.S. Pat. Nos. 4,129,272; 4,363,458; and 4,601,443 to Jones et al feature airfoil structures which are inflatable by ram-air when in use. Each of these structures include a flexible multi-cell air fillable envelope having a removable solid rod stiffener along its leading edge. The harness system of each of the Jones et al. inventions involves essentially two control strings fastened to opposite ends of the stiffener rod. This arrangement allows the orientation of the airfoil to adjust itself somewhat relative to the wind forces and the stiffener rod about which the airfoil pivots.

The airfoils of the aforementioned Jalbert patents however are deficient in the sense that they fail to provide kite enthusiasts with a kite that has the characteristics of favorable lift, control and performance for all environmental conditions encountered. These deficiencies in lift, controllability, and maneuverability result in the airfoils of the aforementioned patents being incapable of performing stunts like those obtainable when using dual string delta wings kites such as that disclosed in Applicant's U.S. Pat. No. 4,286,762.

PURPOSE OF THE PRESENT INVENTION

A primary purpose of the present invention is to provide a kite having favorable characteristics which include, among other, very favorable lift characteristics along with a very high degree of controllability and maneuverability in all wind conditions. These advantages are especially desired by high performance stunt kite enthusiasts.

Moreover, an additional purpose of the invention is to provide a kite which is convenient to transport and does not require time to be assembled or disassembled.

In addition, a further purpose of the invention is to provide a kite which is safe.

SUMMARY OF THE PRESENT INVENTION

The invention is provided to achieve, among other, the above stated purposes and objectives.

To achieve these purposes and objectives the invention introduces a novel kite structure which provides improved lift, control, performance, and maneuverability. This novel kite structure includes a kite body which has an airfoil configuration in vertical longitudinal cross-section. The kite also includes connecting means for connecting the kite body to a pair of control strings which are held by the kite's operator. The connecting means are spaced transversely across the kite body such that there exists a transversely spaced pair of left connecting elements and a transversely spaced pair of right connecting element. The connecting elements in each pair converge downwardly toward each other to a point where they are connected together. A pair of control strings are connected respectively to these points where the connecting elements come together.

In a preferred embodiment of the present invention the kite body is comprised of upper and lower rectangular sheets which are joined together to form a kite body. Extending along the leading or forward edge of the kite body is stiffening means which includes at least two stiffening members and at least one flexible joint connecting these members to facilitate relative movement therebetween.

The stiffening members themselves are preferably flexible, and they are capable of assuming various curvatures depending on the interplay between the wind forces and the tension forces created by the connecting means attached to the kite body. Additionally, the flexible joint between the stiffening members imparts the added advantage of allowing for the kite operator to manipulate one stiffening member with respect to another. This ability to manipulate the control strings so that one stiffening member moves with respect to the other produces a corresponding change in the kite's body rearwardly of the stiffening members.

Hence, the invention allows for the stiffening members to adapt individually to their environment. This feature leads to better kite performance as will be explained more fully hereafter. In addition, the ability of the operator to manipulate one section of the kite with respect to another section by drawing on a control string results in further advantages such as kite controllability and maneuverability.

Another feature of the invention that leads to the invention's improvement characteristics is the control of the leading edge curvature as it exists in a transverse vertical plane. As noted above the curvature of the stiffening means extending along the leading edge is dependent, in part, on the tension in the connecting means. In a preferred embodiment of the present invention, each connecting element previously referred to includes one or more keel members attached to the kite body and a corresponding number of bridle strings attached to the keel members.

The left pair of connecting elements includes an inboard combination of keels and bridle strings and an outboard combination. Likewise, the right pair of connecting elements includes an inboard combination of keels and bridle strings and an outboard combination. By forming the outboard combination shorter than the corresponding inboard combination, it is possible to regulate the curvature of the leading edge in a manner conductive to improved kite performance. More particularly, the outboard elements are made shorter so that they are kept in constant tension while the inboard members are made a specific length greater than the outboard elements so that during heavy winds they allow the leading edge to assume optimum curvature but during lighter winds they remain slack.

A desirable feature of a preferred embodiment of the invention is the formation of open ended ram-air cells between the upper and lower sheets. The use of ram-air cells to internally pressurize and inflate the airfoil body results in additional improvements in the kite's performance. For instance, in addition to the increased lift brought about by the pressure differential created by the airfoil, the internal pressure of the cells plays a role in achieving the desired curvature of the leading edge. That is in certain situations, where the internal pressure of the cells is greater, the cells will act to cause the leading edge to curve to a lesser extent as is desirable in such situations.

A disadvantage of using ram-air inflatable cells in the past has been that drag is created because of turbulence and air flow separation along the outer surface portion of the kite body adjacent the leading edge portion. This disadvantage is minimized in the present invention by forming the stiffening means and the upper sheet so that the stiffening means has an external surface which is curved and merges smoothly and without interruption into the upper sheet of the kite body, thus creating better lift characteristics. Furthermore, turbulence is reduced by positioning the stiffening means at an elevation directly below the upper surface of the kite body and above the lower surface of the kite body so that the cell openings are partially blocked. This arrangement of partially blocking the cell opening does not prevent quick inflation of the cells, as the cells are positioned to receive in efficient fashion the lower stream of the air which flows from the leading edge stiffener.

Thus, the use of a flexible stiffening means with at least one flexible joint, the use of transversely spaced connecting means of unequal lengths, and the use of ram-air inflatable cells which are partially obstructed by the stiffening means, each contribute to the kite's improved performance over the prior art.

The invention does not rely on rigid struts, rods, blocks or other such parts usually associated with high performance kites, so the kite does not become disassembled or damaged upon impact. The absence of rigid components also reduces the risk that the fabric forming the skin of the kite will be ripped or torn.

Further, as the stiffener members can be folded upon one another by pivoting one with respect to the other about the flexible joint, it is possible to hold the kite and roll the flexible upper and lower sheet around the flexible members. This allows for the entire kite structure to be fitted into a small container for easy transport. Additionally, the kite can be stored in a completely assembled state so there is never a need to assemble or disassemble the kite.

In addition, the design of the kite is such that it is safe for both the operator and others where the kite is flown.

BRIEF DESCRIPTION OF THE DRAWINGS

FIG. 2 is a side view of the airfoil kite shown in FIG. 1.

FIG. 3 is a front elevational view of an eight cell airfoil kite.

DETAILED DESCRIPTION OF THE DRAWINGS

Figure 1:
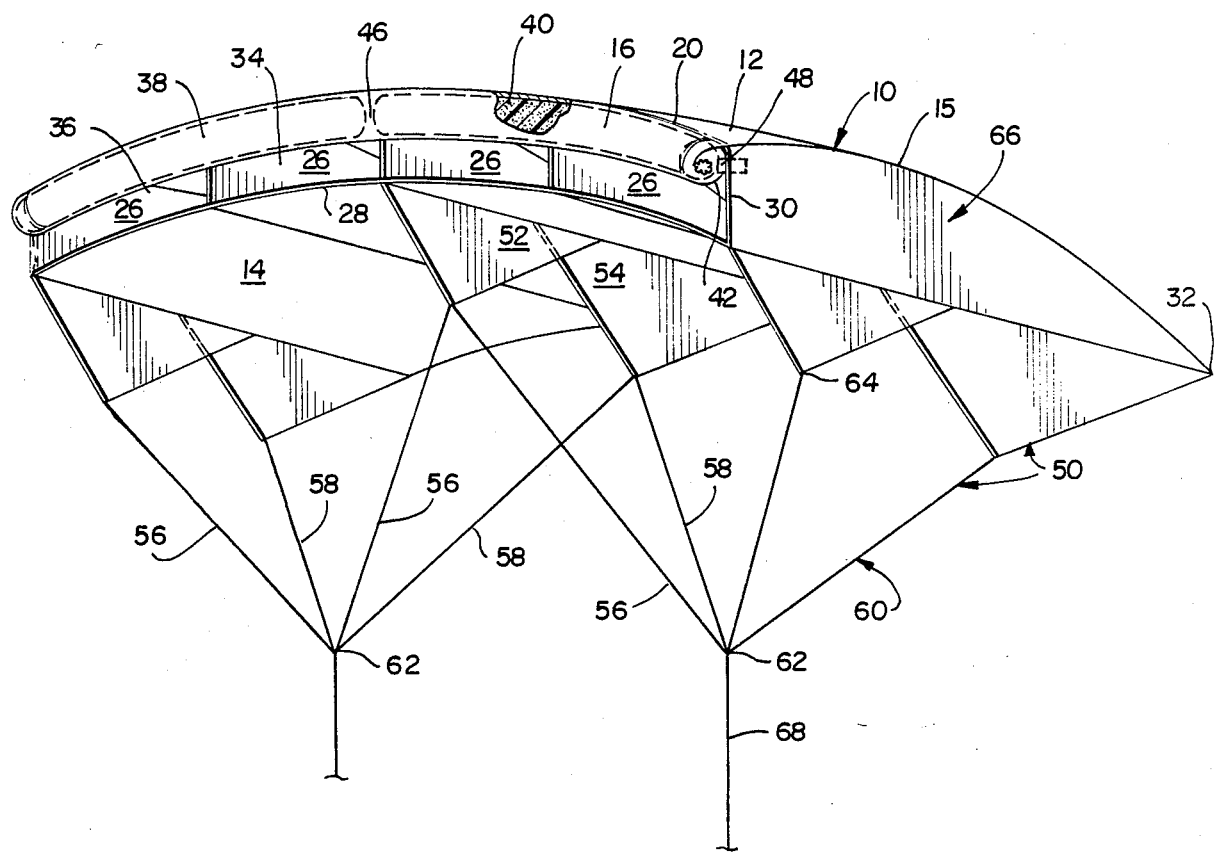
FIG. 1 is a perspective view of a four-cell airfoil kite in flight.

Referring to FIG. 1, there is shown a kite 10 having an upper sheet 12 and a lower sheet 14. These sheets are essentially rectangular planar sheets which, when the kite is inflated, assume a curved configuration. In one preferred embodiment shown in FIG. 1, the upper and lower rectangular sheets 12 and 14 have the same width and length dimensions. It is possible, however, without departing from the scope of the invention, for variations to be made. For instance, the upper sheet 12 may be made slightly wider than the lower sheet 14 such that when the kite is inflated the arc length of the upper sheet 12 exceeds that of the lower sheet 14.

Referring again to FIG. 1 it can be seen that when the kite is in flight, the upper sheet 12 assumes both a longitudinal curvature 15 and a transverse curvature 20. The longitudinal curvature 15 of the upper sheet extends from the forward edge 16 to the rearward edge 18 as best shown in FIG. 2. Additionally, the lower sheet 14, in this embodiment, is shown to be essentially straight in the longitudinal direction.

When the kite is in flight, both the upper sheet 12 and the lower sheet 14 assume a transverse curvature 20 which extends between the outboard sides 22, 24 as shown in FIG. 3 of the kite body.

It has been determined that if the kite's transverse width exceeds two times its length, poor performance results. Likewise, a kite performs poorly if its width is less than its length. Optimum performance of the kite is achieved when the width to length ratio is about 4:3.

Both the upper and lower sheets 12, 14 of the kite are preferably constructed from ¾ ounce ripstop sailcloth. It would be possible, however, to use any other suitable skin for the kite body and it is not essential that both the upper and lower sheet be formed of the same material.

In FIG. 1 there are also shown cell dividers 26 which extend in the longitudinal direction from the forward edge 28 of the lower sheet 14 to the rearward edge 18 of the kite body. Each of these dividers has a configuration like the outboard side edge 22 shown in FIG. 1. That is, the upper edge of the divider is curved from the upper point of forward edge 30 to the point 32 which coincides with the rearward edge 18.

The cell dividers as shown in FIG. 1 extend essentially vertically between the surfaces of the upper and lower sheets 12 and 14. In addition, their upper and lower edges are secured to the upper and lower sheets. Thus, the dividers create a series of open ended ram-air cells 34 with inlets 36.

The kite gains its airfoil shape when, due to a ram-air effect, the cells 34 become inflated and the dividers 26 are placed in tension.

In the embodiment shown in FIG. 1, there are three interior dividers and two exterior dividers which coincide with the outboard side edges 22, 24 of the kite. These dividers 26 are equally spaced across the forward edge of the kite body so as to form four cells. FIG. 3, on the other hand, represents another preferred embodiment of the present invention which has eight cells. There also exists the possibility of having more than eight cells or less than four cells. Furthermore, the scope of the invention contemplates dividers 26 which are unequally spaced from one another.

The interior dividers 26 are formed of the same material as the upper and lower skin while the exterior dividers are formed of a heavier 1½ ounce ripstop cloth. Again, variations in the type of material being used are possible without going beyond the scope of the invention.

Referring now to FIGS. 1 and 3, there can be seen stiffening means 38 extending along the forward edge of upper sheet 12. The stiffening means 38 includes at least two flexible stiffener members 40. These stiffener members are contained in a sleeve 42 which can be made of the same material as the upper sheet 12. The sleeve is attached along its length to the upper sheet as shown in FIG. 1. Closures 44 are provided at the ends of the sleeve 42 as shown in FIG. 2 to keep the flexible members 40 inside the sleeve.

The stiffening means 38 keeps the forward edge from collapsing during maneuvers and it improves the efficiency of the airfoil's leading edge. The flexible stiffener members may be foam, inflatable bladders, or hollow open-ended tubes made from MYLAR or other synthetic sheeting. The characteristics of the stiffener may be varied by changing the inflation pressure of an inflated stiffener or changing the wall thickness of a Mylar tube stiffener. The characteristics of a foam stiffener may be varied by (1) selecting foam having a suitable an ILD (indentation load deflection) which is a measure of the foam's ability to return to its original shape after being compressed, and (2) changing the degree to which the foam is compressed within the sleeve 42. Both of these factors contribute to the rigidity or flex characteristics of a foam leading edge stiffener.

The degree of flexibility of the leading edge stiffener is important. There must be enough stiffness to give the forward edge of the kite definition and stability under a variety of wind conditions, but it must not be so stiff that it cannot conform to the optimum curvature of the kite determined by the balance of factors to be described hereafter.

The stiffening means includes at least one flexible joint 46 which is depicted in FIG. 3. The flexible joint 46 allows one flexible member 40 to "hinge" or pivot relative to an adjacent flexible member. When a kite operator pulls on the left control string in FIG. 1, the left half of the kite is activated because it is "hinged" to move freely in relation to the right half of the kite. The opposite is true when an operator pulls on the right control string. This produces a more efficient control response. When an operator pulls on the left string the left half or section of the kite can move without dragging the right half into the action and vice versa.

One way of forming the flexible joint, shown in FIG. 3, provide two distinct stiffener members 40 inside an encompassing sleeve 42. The sleeve acts as a hinge which enables one stiffening member to move easily relative to the other stiffening member.

This controllability feature brought about by the flexible joint 46 is an important differentiation from prior art kites of Jones et al. which rely on a flexible spar member. Such a prior kite has a shape and a forward edge stiffener which continually changes curvature solely in response to changes in wind velocity. In contrast the present invention, as illustrated in FIGS. 1 and 2, has a forward edge composed of two semirigid flexible members joined at the middle with a "hinge".

Moreover, the flexible stiffener members 40 will flex in heavier winds to allow each section, respectively, to depower and spill air to facilitate stunt maneuvers.

Although one preferred embodiment of the present invention includes only two flexible stiffener elements 40, it may be possible to use additional flexible stiffener members if suitable changes are made to the kite body, connecting means and control strings.

FIG. 2 shows tabs 48 which attach the ends of sleeve 42 to respective exterior dividers 26. The upper surface of the sleeve 42 is positioned at an elevation aligned with the forward edge 16 of the upper sheet 12, and the lower surface of the sleeve 42 is somewhat above the forward edge 28 of the lower sheet 14. The sleeve 42 of stiffening means 38 is curved or rounded and the forward edge 16 of the upper sheet extends away from its point of attachment with the sleeve such that a smooth curve is formed. The smooth curve in combination with the curved or circular exterior of the sleeve 42 is analogous to the rounded leading edge of an airplane wing. This improves the lift characteristics of the airfoil shaped kite, and it reduces turbulence. Immediately below the sleeve 42, the uncovered portion of the air inlets 36 are located. The partially covered inlet openings 36 permit ram-air to be driven into cells 34. The inlet openings 36 create some turbulence due to their drag effect but this turbulence is minimized because the inlet openings are small and they are located below and to the rear of the forward edge of the tubular sleeve 42.

In FIGS. 1–3, there is illustrated connecting elements 50 which include a forward keel 52, a rearward keel 54, and bridle strings 56, 58 two pairs of which combine to form a bridle 60. The bridle strings 56 and 58 have their upper ends attached to fabric loops sewn at the lowermost points 64 of keels 52 and 54. The lower ends of the strings 56 and 58 converge downwardly to a swivel connector 62 as shown in FIG. 2.

The swivel connectors 62 allow for adjustments to be made to the angle of attack of the airfoil 66. Adjustments are made by moving the swivel connectors 62 forward or back on respective pairs of bridle strings 56 and 58 to increase or decrease lift and adjust the kite for optimum performance in given wind conditions.

Each swivel hook 62 is connected to one of the control strings 68. These control strings can be manipulated by the kite operator to vary the relationship between the right and left sections of the kite as previously noted.

The performance of the kite is highly dependent on the amount of transverse curvature in the forward edge 16 of the airfoil. If there is too little curvature so the kite is flat, it is not adequately responsive to performance commands. Too much curvature makes the airfoil inefficient so it will not perform properly.

The transverse curvature of the kite is determined in part by the relative lengths of the bridle strings 56, 58. Referring now to FIG. 3 there are illustrated inboard connecting elements 70 and 71, both of which share a common pair of forward and rearward keels 52 and 54. On the outboard side of connecting elements 70 and 71, are connecting elements 72 and 73. To increase the curvature of a kite such as the one shown in FIG. 3, the length of bridle strings indicated by D are adjusted with respect to the lengths of the pairs of bridle strings indicated by B and F. Likewise, the curvature of the forward edge of the left half of the airfoil 66 can be modified by adjusting the pair of bridle strings indicated by C with respect to the length of the bridle strings indicated by A and E. If the same change is made in both the fore and aft bridle strings of the bridle string pairs, the angle of attack is kept constant.

Figure 4:
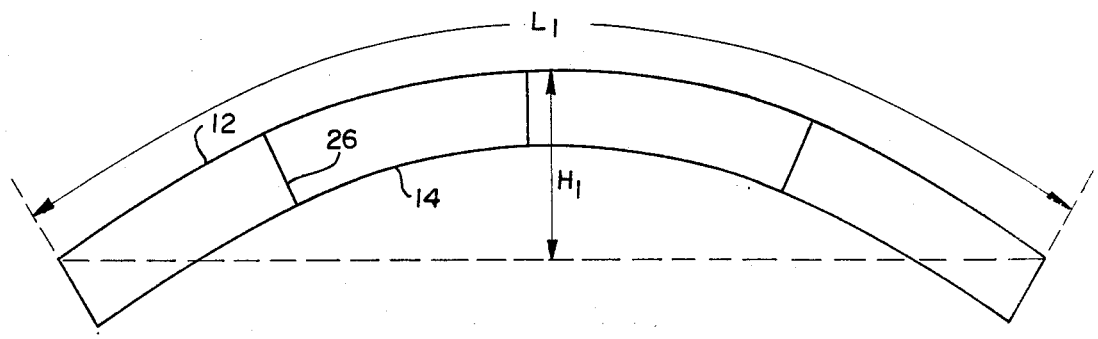
FIG. 4 is a schematic view of the forward end of the airfoil kite shown in FIG. 1.

It has been determined that there is a range of curvature which results in optimum performance. In FIG. 4 there is illustrated a schematic of the forward end of the airfoil 66. Through experimentation it has been determined that favorable performance of a four cell airfoil of FIG. 1 occurs when the arc height H1 of the lower sheet 14 is between about 11% and 23% of the length of the transverse arc L1 of the lower sheet. Optimum results are achieved when the maximum curvature height is about 17% of the length of the arc L1.

If the arc height is less than about 11% of the arc length the kite has good lift characteristics but controllability is tentative and/or insufficient.

When the arc height is more than about 23% of the arc length L1, the kite may have excellent controllability, but lift will be diminished and problems will be experienced with wind shadows during turns. It has been found that, during turns, a substantial portion of the kite falls into a wind shadow. This reduces lift and causes flying problems. Also, the kite has a tendency to fold over on itself during turns when there is insufficient transverse curvature.

To achieve optimum performance for the four cell embodiment, it was found that the length of bridle strings A should be about 70% of the length of the corresponding bridle strings C. Similarly, the lengths of the bridle strings B should be about 70% of the lengths of the corresponding strings of pair D. These string length proportions are determined with all forward keels being of the same dimensions, and all rearward keels being of the same dimensions. Accordingly, the ratio of the connecting elements 70, 71, 72, 73 will be essentially the same. It is possible to vary the relative heights of the keels if appropriate changes are made in the bridle string lengths to maintain the same ratios.

It should alsio be noted that the same ratios can be applied in the eight cell embodiment if the two bridle string pairs E and F are also adjusted to achieve the desired maximum critical height.

When the kite of FIG. 3 is flying in light wind or when it is maneuvering in parts of the sky where there is less wind relative to the kite, the inboard bridle strings A, B, C and D become slack and the entire force of the kite is supported by the outboard bridle strings E and F. In this situation, the transverse curvature of the leading edge is reduced because of the effect if the ram-air inflating the cells. This makes the foil shape more efficient in light air.

However, in heavier wind or when the kite is flown in a part of the sky when it is subjected to more wind, the maximum possible curvature is achieved and bridle string pairs A, B, C and D become taut. This additional curvature is desirable because it permits the kite to spill air and depower itself in heavier winds.

The improved controllability of the invention, as noted previously, is greatly enhanced by the flexible joint 46 between the flexible member 40. When the right control string is pulled, it effectively depowers the right half of the kite. This allows the left half of the kite to drive up and to the right pivoting around the right half of the kite which acts as a "sea anchor". When the kite is pointing in the desired direction the strings can be equalized and the kite will continue straight in that direction. If the right string continues to be pulled the kite will go into a loop or a series of loops until they are equalized. Left turns are made in a converse fashion.

Because the kite can be pointed in a desired direction, the operator can direct the kite so that its forward motion is up to two or three times the speed of the wind. The kite flies in apparent wind which is a combination of the actual wind and the wind created by the kite's forward motion. As a consequence of this a stunt kite which is skillfully maneuvered creates its own wind as a result of its forward motion and can fly in less actual wind than one might expect.

An added favorable characteristic of the invention is that it is capable of flying in the full downwind sky section relative to the position of the operator. In other words, the kite is capable of flying straight overhead, far right, far left and directly downwind with respect to the operator. The efficiency of the design and the specific wind conditions determine how much of this potential can be realized. When the kite is flying straight downwind, the forces bear on it entirely differently than when it is flying at the far left, far right or straight overhead. When located directly downwind from the operator, the kite has maximum forward motion, acceleration and drive caused by the sled effect of the wind and little if any airfoil lift effect. When the kite is right, left or overhead with respect to the operator the kite has less acceleration, less drive and less pull, and it holds its position in the sky primarily due to the lift generated by the airfoil. In between these extremes there is a mix of the forces which causes the kite to perform as it does.

Another advantage of the invention is that kite enthusiasts can make numerous adjustments to fit their tastes and needs. The adjustments which can be made to optimize performance include; (1) varying the angle of attack by adjusting the swivel connectors with respect to forward and aft bridle strings, (2) changing the maximum curvature parameter by varying the length of the inboard pairs of bridle strings with respect tto the outboard pairs of bridle strings, and (3) adjusting the stiffness of the flexible stiffener member 40 by increasing the pressure in an inflatable bladder, replacing the stiffener members with stiffener members having a different foam density and/or compression, or by changing the thickness of a tubular Mylar stiffener.

While this specification has illustrated and described preferred embodiments of the present invention, it is understood that it is capable of many modifications. Therefore the invention is not limited to the precise details set forth, but embraces such changes and alterations as fall within the purview of the following claims.

What is claimed is:

1. A controllable ram-air airfoil kite, comprising:
   an upper sheet having a forward edge, a rearward edge, and two side edges;
   a lower sheet having a forward edge, a rearward edge, and two side edges;
   dividing means for forming a plurality of ram-air cells in said airfoil, said dividing means including a plurality of dividers each having a first edge attached to said upper sheet and a second edge attached to said lower sheet, said dividers extending between the forward and rearward edges of said upper and lower sheets and spaced apart from one another along the forward edge of said lower sheet so as to form a plurality of cell openings;
   stiffening means having at least two sections positioned along the forward edge of said upper sheet, at least one flexible joint connecting the sections of said stiffening means to facilitate relative movement between said sections; and
   connecting means for connecting said airfoil to at least two separate control strings, said connecting means including at least two keels attached to the side edges of said lower sheet.

2. An airfoil kite according to claim 1, having a sleeve formed along the forward edge of said upper sheet, said stiffening means being flexible and having sections contained within said sleeve, said flexible joint being a portion of said sleeve which extends between the two stiffener sections.

3. An airfoil kite according to claim 2, wherein said sections of the stiffening means are inflatable.

4. An airfoil kite according to claim 2, wherein said sections of the stiffening means are formed of a foam material.

5. An airfoil kite according to claim 2, wherein said sections of the stiffening means are tubular members.

6. An airfoil kite according to claim 2, having eight cells formed therein.

7. An airfoil kite according to claim 2, having four cells formed therein.

8. An airfoil kite according to claim 1, wherein said stiffening means is rounded in cross-section and is positioned at an elevation which is between said upper and lower sheets such that the cell openings are partially covered.

9. An airfoil kite according to claim 1, wherein said connecting means includes at least one intermediate keel member, a first bridle, and a second bridle.

10. An airfoil kite according to claim 9, wherein said first and second bridles are comprised of a plurality of strings each of which is attached to one of the keel members.

11. An airfoil kite according to claim 10, wherein the strings attached to the keel members on the sides edges of said lower sheet are shorter than the strings attached to the intermediate keel member, and the shape of said stiffening means varies from a minimum transverse curvature to a maximum traverse curvature which is limited by the lengths of said bridle strings, whereby in heavy wind conditions a maximum curvature is achieved and all bridle strings are tensioned, and in lighter wind conditions only the strings attached to the keels on the side edges of said lower sheet are tensioned.

12. An airfoil kite according to claim 1, wherein said connecting means includes at least two outboard connecting members connected to opposite side edges of the lower sheet, said outboard connecting members having mutually convergent lower ends, at least two inboard connecting members which have their upper ends located between the outboard connecting members and lower ends which are mutually divergent, a first control string connector located at the lower ends of a first said outboard connecting member and a first said inboard connecting member, a second control string connector located at the lower ends of a second said inboard connecting member and a second said outboard connecting member, said inboard connecting members being slack andforming means for limiting the extent of upward movement of inboard portions of the airfoil.

13. A controllable airfoil kite, comprising a body which has an airfoil configuration in vertical longitudinal cross-section;
   connecting means for connecting said body to separate left and right control strings, said connecting means including a transversely spaced pair of left connecting elements and a transversely spaced pair of right connecting elements, said connecting elements in each pair converging downwardly toward each other to a point where they are connected together and to a respective one of said control strings,
   each said pair of connecting elements including an outboard member and an inboard member, said outboard member being shorter than its respective inboard member, whereby said outboard members are taut, and the inboard members are slack in lighter winds and become taut in heavier winds to limit the extent of upward movement of inboard portions of the kite.

14. An airfoil kite according to claim 13, wherein said kite has an upper surface which, in transverse vertical cross-section, is an arc having a height which is about 11% to 23% of its length.

15. An airfoil kite according to claim 14, wherein said arc has a height which is about 17% of its length.

16. An airfoil kite according to claim 13 wherein the length of said outboard members is about 70% of the length of the inboard members.

17. An airfoil kite according to claim 13, having a leading end provided with transverse stiffening means having at least two sections, and a flexible joint connecting the sections of the stiffening means to facilitate relative movement between the sections in response to forces exerted on the connecting means by the control strings.

18. An airfoil kite according to claim 17, wherein said stiffening means has only two said sections.

19. An airfoil kite according to claim 17, having a sleeve formed along the leading end of an upper portion of said kite body, said stiffener sections being contained within said sleeve, said flexible joint being a portion of said sleeve which extends between the stiffener sections.

20. A controllable airfoil kite, comprising a body which has an airfoil configuration in vertical longitudinal cross-section;
   connecting means for connecting said body to separate left and right control strings, said connecting means including a transversely spaced pair of left connecting elements and a transversely spaced pair of right connecting elements, said connecting elements in each pair converging downwardly toward each other to a point where they are connected together and to a respective one of said control strings,
   each said pair of connecting elements including an outboard member and an inboard member, said outboard member being shorter than its respective inboard member, whereby said outboard members are taut, said inboard members being slack in lighter winds and becoming taut in heavier winds to limit the extent of upward movement of inboard portions of the kite.

21. An airfoil kite according to claim 20, wherein the length of said outboard members is 70% of the length of said inboard members.

22. An airfoil kite according to claim 21, wherein said kite has an upper surface which in transverse vertical cross-section, is an arc having a height which is about 11 to 23% of its length.

23. A controllable airfoil kite, comprising a body which has an airfoil configuration in vertical longitudinal cross-section;
   connecting means for connecting said body to separate left and right control strings, said connecting means including a transversely spaced pair of left connecting elements and a transversely spaced pair of right connecting elements, said connecting elements in each pair converging downwardly toward each other to a point where they are connected together and to a respective one of said control strings,
   said kite havin a plurality of longitudinally extending cells, opening means for introducing air into said cells to inflate said cells and shape them into said airfoil configuration, a leading end which has said opening means formed therein, a flexible transverse stiffener located at said leading end at a position which obstructs a portion of said leading end so that the opening means has a height which is less than the height of the leading end of said kite body.

24. An airfoil kite according to claim 23, wherein said stiffener is formed of a foam material.

25. An airfoil kite according to claim 23, wherein said stiffener is inflatable.

26. An airfoil kite according to claim 23, wherein said stiffener is tubular.

27. An airfoil kite according to claim 23, wherein said flexible transverse stiffener has at least two sections, and a flexible joint connects the sections of said stiffener to facilitate relative movement between the sections in response to forces exerted on the connecting means by the control strings.

28. An airfoil kite according to claim 23, wherein said stiffener has a circular cross-section.

29. An airfoil kite according to claim 23, wherein said stiffener has a curved surface which merges with an upper surface of said cell.

30. A controllable ram-air airfoil kite, comprising:
an upper sheet having a forward edge, a rearward edge, and two side edges;
a lower sheet having a forward edge, a rearward edge, and two side edges;
dividing means for forming a plurality of ram-air cells in said airfoil, said dividing means including a plurality of dividers each having a first edge attached to said upper sheet and a second edge attached to said lower sheet, said dividers extending between the forward and rearward edges of said upper and lower sheets and spaced apart from one another along the forward edge of said lower sheet so as to form a plurality of cell openings;
inflatable stiffening means having at least two sections positioned along the forward edge of said upper sheet, at least one flexible joint connecting the sections of said stiffening means to facilitate relative movement between said sections; and
connecting means for connecting said airfoil to at least two separate control strings,
said kite having a sleeve formed along the forward edge of said upper sheet, said stiffening means being flexible and having sections contained within said sleeve, said flexible joint being a portion of said sleeve which extends between the two stiffener sections.

31. A controllable ram-air airfoil kite, comprising:
an upper sheet having a forward edge, a rearward edge, and two side edges;
a lower sheet having a forward edge, a rearward edge, and two side edges;
dividing means for forming a plurality of ram-air cells in said airfoil, said dividing means including a plurality of dividers each having a first edge attached to said upper sheet and a second edge attached to said lower sheet, said dividers extending between the forward and rearward edges of said upper and lower sheets and spaced apart from one another along the forward edge of said lower sheet so as to form a plurality of cell openings;
stiffening means formed of foam material and having at least two sections positioned along the forward edge of said upper sheet, at least one flexible joint connecting the sections of said stiffening means to facilitate relative movement between said sections; and,
connecting means for connecting said airfoil to at least two separate control strings,
said kite having a sleeve formed along the forward edge of said upper sheet, said stiffening means being flexible and having sections contained within said sleeve, said flexible joint being a portion of said sleeve which extends between the two stiffener sections.

32. A controllable ram-air airfoil kite, comprising:
an upper sheet having a forward edge, a rearward edge, and two side edges;
a lower sheet having a forward edge, a rearward edge, and two side edges;
dividing means for forming a plurality of ram-air cells in said airfoil, said dividing means including a plurality of dividers each having a first edge attached to said upper sheet and a second edge attached to said lower sheet, said dividers extending between the forward and rearward edges of said upper and lower sheets and spaced apart from one another along the forward edge of said lower sheet so as to form a plurality of cell openings;
stiffening means having at least two sections positioned along the forward edge of said upper sheet, at least one flexible joint connecting the sections of said stiffening means to facilitate relative movement between said sections; and
connecting means for connecting said airfoil to at least two separate control strings,
said stiffening means being rounded in cross-section and being positioned at an elevation which is between said upper and lower sheets such that the cell openings are partially covered.

33. A controllable ram-air airfoil kite, comprising:
an upper sheet having a forward edge, a rearward edge, and two side edges;
a lower sheet having a forward edge, a rearward edge, and two side edges;
dividing means for forming a plurality of ram-air cells in said airfoil, said dividing means including a plurality of dividers each having a first edge attached to said upper sheet and a second edge attached to said lower sheet, said dividers extending between the forward and rearward edges of said upper and lower sheets and spaced apart from one another along the forward edge of said lower sheet so as to form a plurality of cell openings;
stiffening means having at least two sections positioned along the forward edge of said upper sheet, at least one flexible joint connecting the sections of said stiffening means to facilitate relative movement between said sections; and
connecting means for connecting said airfoil to at least two separate control strings,
said connecting means including at least two outboard connecting members connected to opposite side edges of the lower sheet, said outboard connecting members having mutually convergent lower ends, at least two inboard connecting members which have their upper ends located between the outboard connecting members and lower ends which are mutually divergent, a first control string connector located at the lower ends of a first said outboard connecting member and a first said inboard connecting member, said second control string connector located at the lower ends of a second said inboard connecting member and a second said outboard connecting member, said inboard connecting means being slack and forming means for limiting the extent of upward movement of inboard portions of the airfoil.

* * * * *